(12) United States Patent
Smith et al.

(10) Patent No.: US 7,012,659 B2
(45) Date of Patent: Mar. 14, 2006

(54) IMAGE REPLICATION SYSTEM HAVING FOCUSING MEANS TO RECEIVE REFLECTED LIGHT THROUGH LIGHTGUIDE FROM SPATIAL LIGHT MODULATOR

(75) Inventors: Mark Anthony Gleeson Smith, Malvern (GB); Richard Jonathan Miller, Malvern (GB); Maurice Stanley, Malvern (GB)

(73) Assignee: QinetiQ Limited, (GB)

(*) Notice: Subject to any disclaimer, the term of this patent is extended or adjusted under 35 U.S.C. 154(b) by 105 days.

(21) Appl. No.: 10/481,216

(22) PCT Filed: Jun. 19, 2002

(86) PCT No.: PCT/GB02/02827

§ 371 (c)(1),
(2), (4) Date: Dec. 17, 2003

(87) PCT Pub. No.: WO02/103458

PCT Pub. Date: Dec. 27, 2002

(65) Prior Publication Data

US 2004/0184287 A1    Sep. 23, 2004

(30) Foreign Application Priority Data

Jun. 19, 2001 (GB) .................... 0114862

(51) Int. Cl.
*G02F 1/1335* (2006.01)
*G02F 1/135* (2006.01)
*G01D 11/28* (2006.01)

(52) U.S. Cl. .............. 349/62; 349/5; 349/25; 362/26

(58) Field of Classification Search ............ 349/60–65, 349/5, 11, 25; 362/26, 31; 359/13, 22
See application file for complete search history.

(56) References Cited

U.S. PATENT DOCUMENTS

| 5,164,848 | A | * | 11/1992 | Firth et al. ................ 359/13 |
| 5,353,150 | A | * | 10/1994 | Mangir et al. ............. 359/338 |
| 5,485,291 | A |   | 1/1996  | Qiao et al. ................ 349/62 |
| 5,621,486 | A |   | 4/1997  | Doany et al. .............. 348/756 |
| 5,680,257 | A |   | 10/1997 | Anderson ................... 359/727 |
| 6,753,990 | B1 | * | 6/2004 | Payne et al. ............... 359/22 |

FOREIGN PATENT DOCUMENTS

| EP | 0 562 873 | 9/1993 |
| EP | 1 003 071 | 5/2000 |
| WO | WO 98/37448 | 8/1998 |
| WO | WO 99/52416 | 10/1999 |
| WO | WO 00/75799 | 12/2000 |

\* cited by examiner

*Primary Examiner*—Tarifur R. Chowdhury
(74) *Attorney, Agent, or Firm*—McDonnell Boehnen; Hulbert & Berghoff LLP (57) ABSTRACT

The present invention relates, in one aspect to an image replication system comprising a light guide (2), a light source (8) arranged to direct emitted light into the first end (2a) of a light guide (2), a reflective spatial light modulator (6) and focussing means (16). In a preferred embodiment, the light guide (2) is in the form of an elongate glass rod having first and second parallel polygonal end faces (2a, 2b) which are parallel to the long axis of the rod, the rod having a uniform polygonal cross section along its length. The spatial light modulator (6) is optically coupled to the second end face (2b) of the light guide (2) and the focussing means (16) is arranged to receive light reflected back through the rod from the spatial light modulator (6), whereby to form multiple images of said spatial light modulator in an image plane (18).

35 Claims, 6 Drawing Sheets

IMAGE REPLICATION SYSTEM HAVING FOCUSING MEANS TO RECEIVE REFLECTED LIGHT THROUGH LIGHTGUIDE FROM SPATIAL LIGHT MODULATOR

BACKGROUND OF THE INVENTION (1) Field of the Invention

In a first aspect, the present invention relates to a system for providing illumination of substantially uniform intensity at a location, and in a second aspect to an image replication system.

(2) Description of Related Art

There are several known ways of generating a holographic image. In one method, light modulated by a series of first spatial light modulators (eg. electrically addressed liquid crystal devices) is passed through an array of lenses and focussed onto a second spatial light modulator, whereby a real image is formed on the surface of the second spatial light modulator. Coherent light from a laser impinging on this real image can be used to produce the holographic image in a conventional manner. Such a system has a number of drawbacks which are addressed by the present invention. Holographic imaging is only one application in which the systems of the present invention are useful.

BRIEF SUMMARY OF THE INVENTION

It is an object of the present invention to provide a system for providing illumination of substantially uniform intensity at a location. It is a further object of the present invention to provide an improved image replication system. It is a still further object to provide an improved holographic imaging system.

According to a first aspect of the present invention, there is provided an illumination system comprising:
(i) a light source, and optically coupled thereto,
(ii) an elongate light guide having a polygonal cross section along its length, wherein, in use, non-collimated light derived from the light source enters the light guide at its first end and is transmitted to its second end, and wherein the intensity of transmitted light at said second end is substantially uniform over the area of said second end.

According to a second aspect of the present invention, there is provided an image replication system comprising:
(i) an elongate light guide having a polygonal cross section along its length,
(ii) a light source arranged to direct emitted light, in use, into the light guide at its first end,
(iii) a reflective first spatial light modulator optically coupled to a second end of the light guide, and
(iv) focussing means arranged to receive light reflected through the light guide from the first spatial light modulator, said reflected light having exited the light guide through its first end, and to form multiple images derived from said first spatial light modulator in an image plane.

The light source may be a source of polarised or non-polarised light. Preferably, light entering the light guide is non-polarised. Thus, said system may comprise means for converting polarised light to non-polarised light between the light source and the light guide.

The light guide may be in the form of a solid glass rod (or rod of other optically transparent material) having first and second parallel polygonal end faces, said end faces being perpendicular to the longitudinal axis of the rod. Such a rod, particularly when highly polished, will act as a light guide by virtue of total internal reflection of light passing through the rod incident with the sides of the rod. Use of such a rod is attractive since it can be polished using nonstandard manufacturing techniques. However, it is desirable to use very high quality optical glass to minimise wavefront errors due to glass inhomogeneities.

Preferably, the light guide is of square or rectangular cross section. In the case of a solid (eg. glass) rod, the edges are preferably bevelled to produce a minor surface. More preferably the bevel depth is about 1% or less of the distance between adjacent edges (i.e. less than 1% of the width of the rod sides). The minor surface may be highly polished or diffuse. It will be understood that the bevel depth may vary along the length of the rod and/or the bevel depth of the edges may differ from each other.

Alternatively, the light guide may be a hollow pipe. The internal surfaces of the pipe must be suitably reflective or a reflective coating must be applied to the internal surfaces. As an example, the hollow pipe can be constructed from discrete mirror elements which are mounted to form the pipe (specifically, four mirrors can be mounted at 90° to each other to form a square or rectangular sectioned pipe). In an alternative variation, the pipe may be moulded from one or more separate components (eg. plastic, glass or metal components) which, if a reflective coating is required, may be coated before or after formation of the pipe in the case of a pipe moulded from two or more components or after formation of the pipe in the case of moulding from a single component.

In the case of a hollow pipe, transparent end faces are preferably provided. Such end faces prevent the ingress of dust and other contaminants into the light guide. The provision of end faces allows the interior of the light guide to be sealed from the outside atmosphere. The interior may be under vacuum or gas filled (eg. dry nitrogen) or liquid filled.

The light source may be a source of collimated or non-collimated light. In the former case, a light spreading element such as a diffuser is disposed in the light path between the light source and the light guide.

Preferably the first spatial light modulator modulates the polarisation state of incident light, and is more preferably an electrically addressable spatial light modulator (EASLM). Most preferably, the EASLM comprises a pixelated liquid crystal layer on a reflective silicon backing layer, switched pixels causing modulation of the polarisation state of incident light, unswitched pixels causing no such modulation.

Alternatively, the first spatial light modulator may be one which modulates reflectivity (eg. an array of electrically controlled etalons) or one which modulates angular deflection of incident light (eg. a micromirror array). In the latter case, it will be understood that the angular deflection induced at unwanted pixels must be sufficiently large that light reflected therefrom is outside the area of interest at the image plane.

Since EASLM's are generally rectangular, the light guide conveniently has a rectangular cross section, although it will be appreciated that the cross-section could be any regular or non-regular polygon.

In a first series of embodiments, the system comprises a polariser in the light path between the light guide and the focussing means, oriented such that only light reflected from switched pixels passes therethrough to form an image in the image plane. It will be understood that such embodiments are designed for use with polarised light entering the light guide.

In a second series of embodiments, a polariser is provided between the light guide and the first spatial light modulator, with a fractional-wave plate being provided between the polarise and the first spatial light modulator, wherein the fractional wave plate is chosen such that only light passing through the polariser and fractional wave plate and incident on a switched pixel, passes back through the wave plate and polariser upon reflection from the spatial light modulator. It will be understood that such embodiments are particularly suited for use with unpolarised light. It will be understood that in this series of embodiments (and in those embodiments where the EASLM does not modify the polarisation state of incident light, the light guide may be provided with a silver, aluminum or other reflective coating.

In a highly preferred embodiment of the second series, switched pixels of the EASLM are designed to induce a 90° rotation of polarisation state of incident light, and said fractional-wave plate is a quarter-wave plate.

In practice, the light guide will not be in direct contact with the object plane of the first spatial light modulator. This separation can result in "lost pixels" (i.e. pixels which are not imaged properly) at the edges of the first light modulator. In order to overcome this problem, the light guide is preferably provided with an additional light source around its periphery at an end of the light guide which, in use will be adjacent the first spatial light modulator. More preferably, said additional light source comprises a plurality of optical fibres, in which case a diffusing element is preferably provided between the optical fibres and the first spatial light modulator. In a particularly preferred embodiment, a light steering element (eg. a diffractive) is provided (preferably between the additional light source and the diffusing element when present) to direct light emitted from the additional light source generally towards the edges of the first spatial light modulator.

An image screen may be provided for viewing images formed in the image plane. Alternatively, a photsensitive material may be provided in the image plane (eg. photosensitive paper for printing). Preferably, however, a second spatial light modulator is provided in the image plane. More preferably, the second spatial light modulator is an optically addressable spatial light modulator and most preferably a modulatable liquid crystal layer on a photoconducting film (eg. a ferroelectric liquid crystal light modulator on amorphous silicon).

Preferably, means are provided to produce an image from light reflected from the first spatial light modulator in a predetermined region of the image plane. Said means may comprise an electro-optical or mechanical shutter (located as closely as possible to the image plane to avoid inter-image cross-talk or loss of pixels at image boundaries). Alternatively, if a second spatial light modulator is in the image plane, the second spatial light modulator may be selectably sensitised to incident light.

As a further alternative, the system may be arranged to produce an image only in a predetermined region of the image plane. This may be achieved by the provision of means to introduce an angular bias to light from the light source before it enters the light guide (eg. a scanning mirror) couple to a narrow angle diffuser.

The illumination system (or image replication system) may comprise a plurality of light guides. Said light guides may be of the solid transparent type or hollow. Preferably, the light guides are arranged in an array such that adjacent light guides are mutually spaced. Conveniently, channels between adjacent light guides provide means for delivering light to the first ends of the light guides.

Preferably, the illumination system comprises means for efficiently delivering light from the light source to the light guide. Said light delivery means preferably comprises a beam splitter between the light source and the light guide and an optical relay between the light source and the beam splitter. In a preferred arrangement, the optical relay comprises a pair of mutually spaced lenses with a variable aperture stop therebetween.

BRIEF DESCRIPTION OF THE SEVERAL VIEW OF THE DRAWINGS

Embodiments of the invention will now be described by way of example only, with reference to the accompanying drawings, in which.

DETAILED DESCRIPTION OF THE INVENTION

Figure 1:
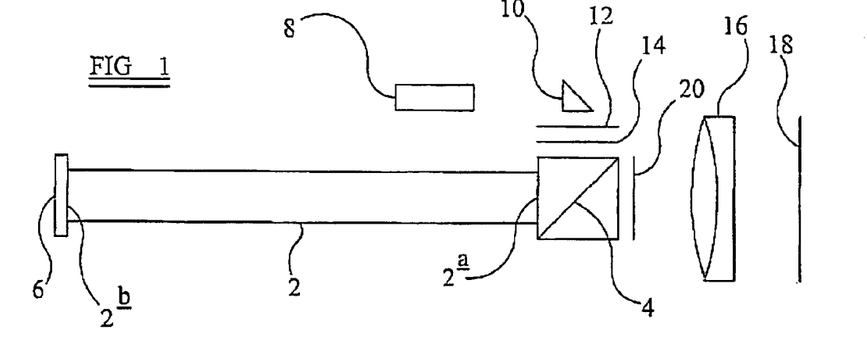
FIG. 1 is a schematic representation of an image replication system in accordance with the present invention.

Referring to FIG. 1, a system in accordance with the present invention comprises a light guide 2 made from a solid block of optical glass having a rectangular cross section and optically flat first and second end faces (2a, 2b) which are each perpendicular to the longitudinal axis of the block. The four sides of the block are each parallel to the longitudinal axis of the block and are also optically flat. A beam splitter 4 is optically coupled to the first end face 2a of the light guide 2 and an electrically addressed spatial light modulator (EASLM) 6 is optically coupled to the second end face 2b of the light guide 2. The EASLM (of per se known type) is a pixelated rectangular liquid crystal display mounted on a reflective silicon layer. Electrically switched pixels induce 90° rotation in the polarisation state of light incident thereon. It will be understood that since the EASLM 6 is rectangular, it is convenient for the light guide 2 to have a rectangular cross section, (in addition, the cross section of the light guide 2 matches the size of the object data area on the EASLM 6). Although if other non-rectangular spatial light modulators are employed, the light guide 2 could be constructed with any appropriate polygonal cross section.

The system also comprises a laser 8 (in this case an argon laser), a beam steering prism 10, a light spreading element in the form of a diffuser 12 and a first polariser 14. The (optional) beam steering prism 10 directs light from the laser 8 towards the beam splitter 4. The use of such a prism 10 facilitates a more compact design of system, since the laser 8 can be arranged parallel to the light guide 2 as shown in FIG. 1. The diffuser 12, which in this case is a holographic diffuser of an array of small lenses is positioned between the prism 10 and the beam splitter 4. It will be understood that any other type of diffuser (such as a spinning diffuser) could be employed. The first polariser 14 is positioned between the diffuser 12 and the beam splitter 4.

The system also comprises an imaging lens 16 and an imaging screen 18, both of which are arranged on the longitudinal axis of the light guide 2 adjacent the beam splitter 4. The design of the lens 16 determines the required length of the light guide 2. A second polariser 20 is positioned between the beam splitter 4 and the imaging lens 16 on the longitudinal axis of the light guide 2.

Figure 2:
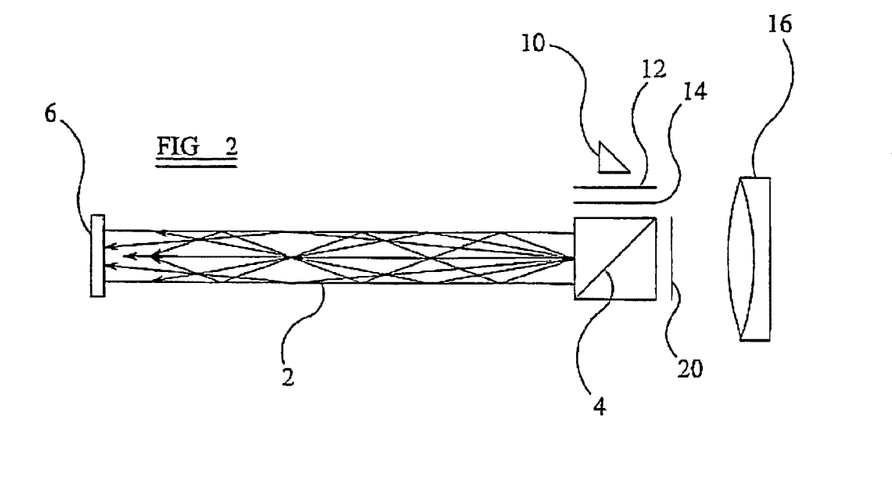
FIG. 2 is a schematic representation of part of the system shown in FIG. 1, showing the passage of light along the light guide.

In use, polarised light from the laser 8 passes through the steering prism 10 and towards the diffuser 12. The diffuser 12 causes the light to become non-collimated with a specific intensity distribution as a function of angle. The first polariser 14 ensures that only polarised light passes into the beam splitter 4. Approximately half the light is directed from the beam splitter 4 into the light guide 2 at its first end face 2a. It will be understood from the foregoing that the intensity of light over the first end face 2a of the light guide 2 is not uniform. As shown in FIG. 2, light incident on the sides of the light guide 2 is internally reflected, the number of reflections being dependent upon the angle of light relative to the longitudinal axis of the light guide 2. The spatial distribution of light reaching the EASLM 6 is substantially uniform (i.e. uniform intensity distribution) and provides good illumination of the EASLM 6.

Figure 3:
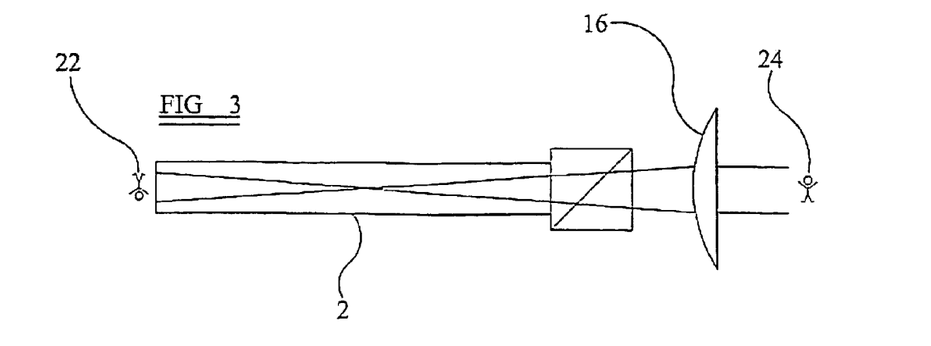
FIGS. 3 to 5 are schematic representations of part of the system shown in FIG. 1, showing image formation on the screen.

Considering FIG. 3, light incident on the EASLM 6 at relatively small angles will be reflected back to the first end face 2a of the light guide 2 without reflection on the sides of the light guide 2. When this light is focussed by the imaging lens 16, an image 24 of the EASLM 6 will be formed on the screen 18. It will be understood that light incident on the EASLM 6 is modulated by the EASLM 6 such that switched pixels represent an "object" 22 formed on the EASLM 6, the image 24 formed on the screen therefore being an image of this object 22. Light incident on unswitched pixels is unmodulated. The second polariser 20 is orientated perpendicularly to the first polariser 14 such that unmodulated light from unswitched pixels does not reach the screen. Although the EASLM 6 in the above embodiment operates by altering the polarisation state of light incident on switched pixels, other embodiments may be envisaged in which switched pixels are reflective and non-switched pixels are light transmissive or absorbing, such that only light incident on switched pixels is reflected towards the screen 18. In such embodiments either one or more usually both of the first and second polarisers 14,20 may be omitted.

Figure 4:
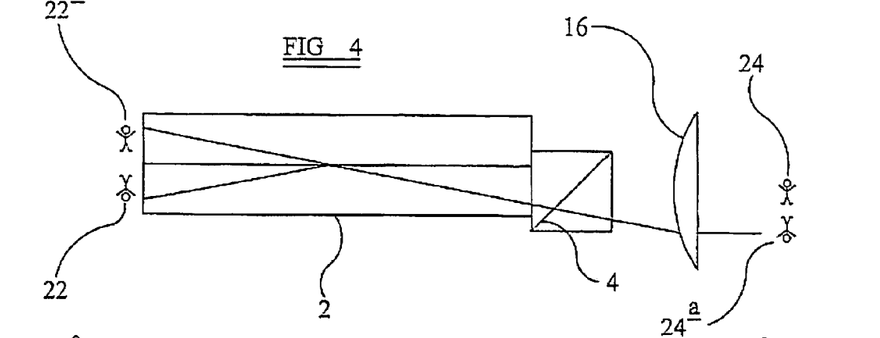
Figure 5:
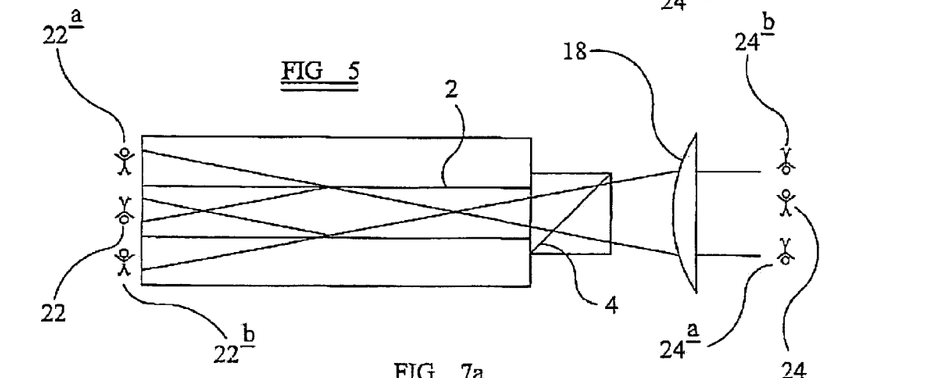

Considering FIG. 4, light reflected from the EASLM 6 at a certain range of (wider) angles will be reflected from one of the side faces of the light guide 2 before leaving the light guide 2 at its first end face 2a. This results in an additional image 24a on the screen, the light appearing to emanate from another (virtual) object 22a. Due to the axial symmetry of the illumination, there will be a virtual object 22b on the opposite side of the longitudinal axis giving rise to a further image 24b on the screen 18 (FIG. 5). If light rays are twice reflected, five images will result. In general, n reflections will result in 2n+1 images. Furthermore, there will be reflections in the perpendicular and diagonal orientations resulting in multiple images throughout the whole of the plane of the screen 18, resulting in a total of $(2n+1)^2$ images, where n is determined by the refractive index and dimensions of the light guide 2 and the angular extent of the diffused source. Thus, the refractive index of the block is chosen according to the desired number of replicated images.

For optimum illumination resulting in good intensity distribution across the image plane, it is required that the size of the illumination patch on the diffuser be larger than the light guide width to ensure that the full required numerical aperture fills the first end 2a (pupil) of the light guide. This results in wastage of a significant portion of the light incident on the diffuser. The fraction of light usefully coupled into the light guide is approximated by $P^2/(P+4B \tan \theta)^2)$, where P is the width of the light guide (for a square cross section), B is the dimension of the beam splitter and θ is the diffusion angle. For example, where P=10 mm, B=20 mm and θ=10°, then the optical throughput efficiency will be approximately 0.503.

Figure 6:
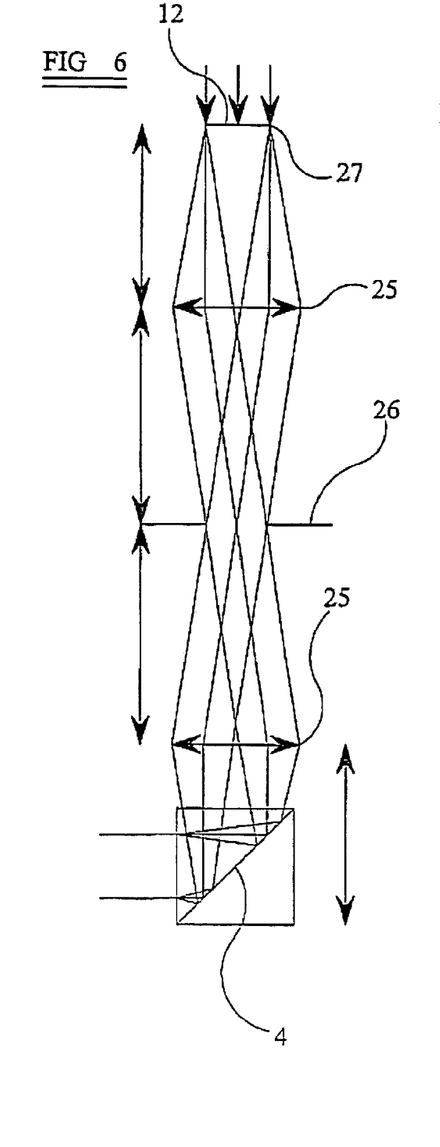
FIG. 6 is a schematic representation of an optical relay for use in the embodiment of FIG. 1.

FIG. 6 shows an optical relay (4f arrangement) for delivering efficient illumination of the required numerical aperture across the light guide pupil in the embodiment of FIG. 1. The relay comprises a pair of mutually spaced lenses 25 with an adjustable aperture stop 26 halfway therebetween. A relay stop 27 limits the size of the collimated illumination patch entering the relay from the diffuser 12.

The relay aperture top 26 also acts as a field stop for the imaging system, as it limits the angular range of rays entering the first end (pupil) 2a of the light guide 2. Therefore, careful control of the relay aperture stop 26 (and therefore the imaging field stop) allows a mechanism for direct control of the illumination distribution at the final image plane 18. One advantage is that the inclusion of an imaging field stop (aperture stop 26 in the relay) sharply limits the size of the final image field (i.e. the number of replications), reducing the need for baffling if many light guides are butted together (as may be required for large active tiling systems—see below). A second advantage arising from the inclusion of a well defined field limiting stop is that the introduction of a field-apodising element is now possible (not shown), such that field dependent attenuation may be applied to offset image intensity variations, via an amplitude transmission mask occupying the stop 26.

A further advantage of the relay arrangement is that stray light due to back reflections from the pupil surroundings towards the image plane 18 (resulting in veiling glare at the image and hence performance degradation) is reduced to zero.

The light guide 2 is mounted using square-apertured metal rings (not shown) located at intervals (for example at the Airy points of the light guide) along its length. The light guide is bonded to the rings by potting adhesive, the light guide being coated with a light absorbing coating at those locations so that light incident at those locations does not contribute to an image in use. In other embodiments, where unpolarised light is used (see below), a reflective (eg. metallic) coating can be applied at the fixing locations. In order to reduce the effect of light loss on the final image, the area of the coatings is kept to a minimum.

In the above embodiment, although the intensity of light reaching the EASLM 6 is uniform, glass inhomogeneity and phase changes imposed by internal reflections have a deleterious effect on the polarisation of the illuminating rays. The polarisation state of a ray emerging from the light guide 2 at its second end face 2a will depend on the angular deviation of the ray from the longitudinal axis of the light guide 2 and the glass inhomogeneity. One solution to this problem is to place an additional polariser between the second end face 2b of the light guide 2 and the EASLM 6. Unfortunately, this causes a variation in the brightness (intensity per unit solid angle) across the angular ray cone, which in turn will vary spatially across the second end face 2b of the light guide.

An alternative solution is to illuminate the EASLM 6 with perfectly unpolarised light, such as from an LED or any other non-polarised light source (if light of a single wavelength is required, an appropriate filter arrangement can be used). There will be no spatial or temporal correlation between vertically and horizontally polarised components of the light, and glass inhomogeneities and internal reflections will have no discernible effect on the polarisation state of the light. As a result, there will be no spatial/angular dependence of polarisation state at the second end face 2b of the light guide 2. Thus, by including a polariser between the light guide 2 and the EASLM 6, the EASLM 6 is illuminated with polarised light having spatially uniform intensity and brightness.

It will be appreciated that when the EASLM 6 is one which modulates light by changing its polarisation state (eg. a liquid crystal panel as described above in which switched pixels act as a half-wave plate and rotate the polarisation of incident light by 90°) light reflected from switched pixels will not pass back through the polariser. The polarisation state of light incident on non-switched pixels is unchanged upon reflection and so will pass back through the polariser. It will therefore be understood that the image formed on the screen will be an inverse or negative image of the object. A positive image can be achieved by the inclusion of a quarter-wave plate.

Figure 7A:
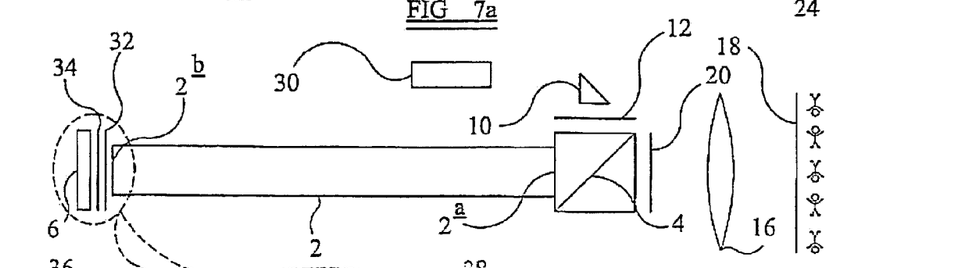
FIG. 7a is a schematic representation of a different image replication system in accordance with the present invention.

Referring to FIG. 7a, the image replication system shown is essentially the same as that of FIG. 1 (corresponding elements being referred to by the same reference numerals), except that the first and second polarisers 14,20 are omitted, and the laser 8 is replaced by a source of unpolarised light 30. A polariser 32 is disposed between the second end face 2b of the light guide 2 and the EASLM 6, with a quarter-wave plate 34 disposed between the EASLM 6 and the polariser 32. The fast axis of the quarter-wave plate 34 is arranged to be at 45° with respect to the polariser 32.

Figure 7B:
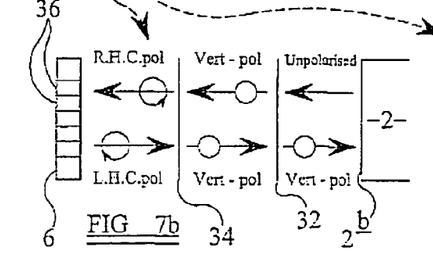
FIGS. 7b and 7c are detail views of part of the system of FIG. 7a, FIGS. 8a and 8bshow mounting arrangements for a bevelled-edge light guide.

FIG. 7b illustrates the effect on the polarisation state of light exiting the light guide 2 incident on switched pixels 36. Firstly, only polarised light (in this case vertically polarised) reaches the quarter-wave plate 34. The vertically polarised light is converted to right-hand circularly polarised light by the quarter-wave plate 34 and is subsequently converted to left-hand circularly polarised light by a switched pixel 36 of the EASLM 6. When the reflected light is passed back through the quarter-wave plate 34 it is converted back to vertically polarised light (since the light is traversing the wave plate 34 in the opposite direction, the fast axis is orientated at −45° to the polariser 32). The reflected vertically polarised light passes through the polariser 32 and back into the light guide 2. As described previously, the light reflected from the switched pixels 36 forms images on the screen 18.

Figure 7C:
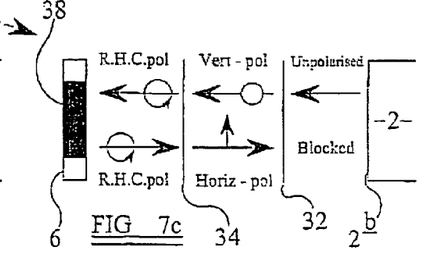

FIG. 7c illustrates the effect on polarisation state of light incident on unswitched pixels 38. As described previously, vertically polarised light is converted to right hand circularly polarised light by the quarter-wave plate 34 on its way towards the EASLM 6. There is no change to the polarisation state upon reflection from the unswitched pixels 38. Further passage through the quarter-wave plate 34 results in the light having a horizontal polarisation. The horizontally polarised light does not pass through the polariser 32. As result, a positive image is formed on the screen 18 from light reflected only from the switched pixels 36.

In the above described embodiments, the light guide 2 is described as being of rectangular cross-section (or of cross section corresponding to the EASLM 6). The requirement for precise 90° angles along the sides of the light guide (square or rectangular section) does not lend itself to easy manufacture. Such edges are easily damaged (eg. chipped) during manufacture resulting in wasted light guides and increased manufacturing costs. This problem may be overcome by a slight modification of the above embodiment (not shown) in which the light guide edges are bevelled at a bevel angle of 45°, resulting in each 90° angled edge being replaced by two 135° angled edges which are less prone to chipping. In other embodiments it will be appreciated that the bevel angel may be different.

In one variation of the modification, the resultant bevelled surface is highly polished. Light will internally reflect from these internal surfaces in the same way as the main light guide surface, thereby resulting in diagonally shifted images being produced on the image screen, the distance of each image from the main image being related to the number of internal reflections and the bevel depth. Although these additional "ghost" images have a negative effect on the overall image quality, the seriousness of the effect is determined by the relative areas of the bevelled and main surfaces (which determines the relative intensities of the desired and ghost images). Thus, with a square section light guide having sides of about 10 mm, the bevel depth is kept to about 100 $\mu$m. This bevel depth is sufficient to mitigate the problem of chipping but small enough such that the ghost images are so weak so as not to affect the overall image quality to any significant extent.

In a second variation, the bevelled surfaces are roughened to form a diffusing surface. Although this will not generate ghost images, there will be a general veiling glare across the image region. As with the polished bevelled surfaces, the detrimental effect is related to the relative areas of the bevelled and main light guide surfaces. At a bevel depth of 100 $\mu$m (for a 10 mm square cross-sectioned light guide) the glare is insignificant.

Figure 8A:
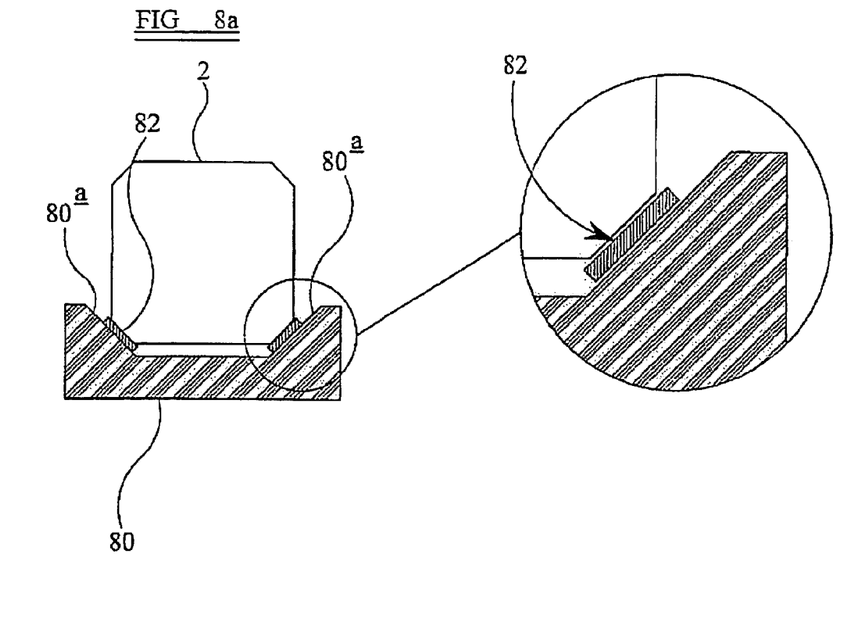

Referring to FIG. 8a, the bevelled light guide 2 can be mounted in a channelled mounting block 80. The mounting block 80 has sloping sides 80a whose angle of slope matches the bevel angle of the light guide edges, and which is machined such that a pair of bevelled edges can be adhered to the sloping sides 80a of the mounting block 80, the intermediate main surface of the light guide standing clear from the base of the channel. If a non-absorbing adhesive 82 is used, the bevelled edges may be provided with a light absorbing coating. In the embodiment shown, the sloping sides 80a are planar. In an alternative embodiment, the sloping sides 80a are provided with castellations so that the light guide 2 is only in contact with the sloping sides 80a or the mounting block 80 at discrete points along its length.

Figure 8B:
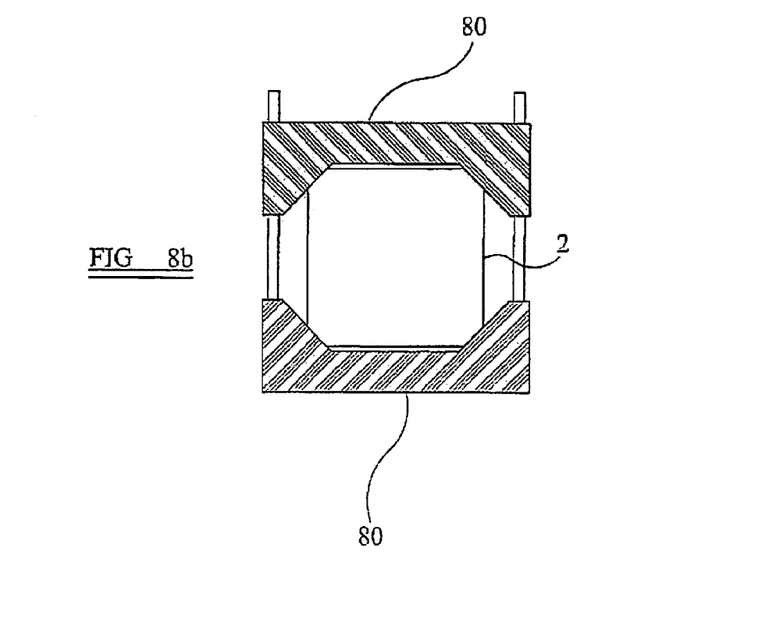

In a slight variation of the above mounting arrangement, the light guide can be mounted between an opposed pair of mounting blocks 80 which are clamped together as shown in FIG. 8b. In this arrangement, no adhesive is required, although a light absorbing coating on the bevelled edges is still desirable.

Figure 9:
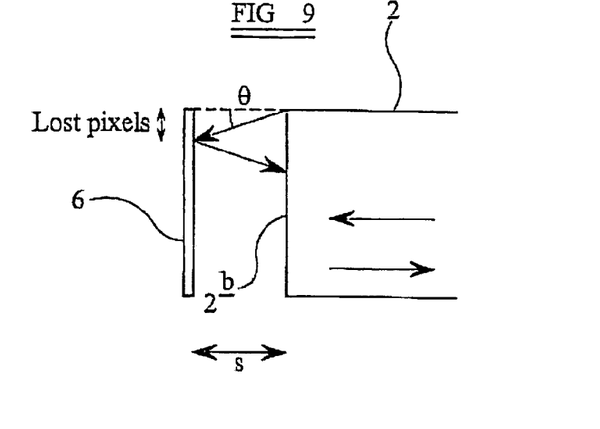
FIG. 9 is a schematic representation of part of the system of FIG. 1, illustrating the "lost pixel" problem.

In practice, the light guide will not be in contact with the object plane. This is clearly the case for the embodiment described with reference to FIGS. 7a to 7c where there is a compensation wave plate and a polariser between the EASLM 6 and the light guide 2. Even in the embodiment described with reference to FIG. 1, the EASLM 6 has a cover glass (not shown) resulting in a small separation between the light guide and the object plane. Referring to FIG. 9, this separation results in "lost pixels" at the edge of the display 6. The number of pixels lost at each edge is given by (s/p)tan θ where s is the separation between the light guide and the object plane (eg. EASLM 6), p is the pixel pitch and θ is the extreme ray angle. θ is dependent on the image being considered, and increases for images further away from the primary image. Thus, the lost pixel problem increases for images moving away from the centre as θ increases.

Figure 10:
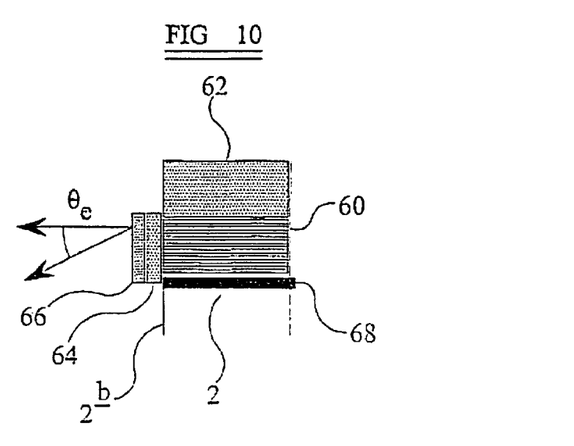
FIG. 10 is a schematic representation of part of an image replication system according to the present invention adapted to overcome the lost pixel problem.

Referring to FIG. 10, an optical fibre bundle 60 is positioned around the periphery of the light guide at its second end 2b, held in place by cladding 62 (a diffractive 64 and a diffuser 66 are positioned at the light emitting end of the optical fibre bundle 60, their purpose being described below). The bundle is separated from the light guide 2 only by a reflective light blocking film 68 to maintain the internal reflecting properties of the light guide 2 to its second end 2b and to prevent light leakage between the guide 2 and the optical fibre bundle 60. In other embodiments (not shown) separate bundles (or other light sources) are provided along each side of the light guide 2. To ensure image continuity, the spacing between the light guide 2 and the bundle 60 must be less than the pixel pitch of the object plane (eg. EASLM 6). To recover all lost pixels, the width of the optical fibre bundle 60 must be equal to stanθe, where θe is the maximum ray angle necessary to produce the image required furthest from the central image.

It will be understood that a significant portion of the light emitted by the optical fibres is directed away from the object plane. The diffractive 64 imposes an angular bias to the light (eg. by an angle θe/2. The diffractive 64 is in close proximity to the optical fibre bundle 60 to ensure that rays reflected from the object plane are not prevented from entering the light guide 2.

The diffuser 66 overcomes the problem of the optical fibres not acting as a continuous light source. The bundle 60 is made up of a 2D array of circular fibres separated by the cladding 62 and filing gaps. As a result, the illumination delivered to the edge pixels is not continuous and the imagery of those pixels may suffer. The diffuser 66 is close to the optical fibre bundle 60, but sufficiently distant to allow homogenising of the discontinuous fibre bundle source (the optimum distance being in the order of the individual fibre pitch).

Figure 11:
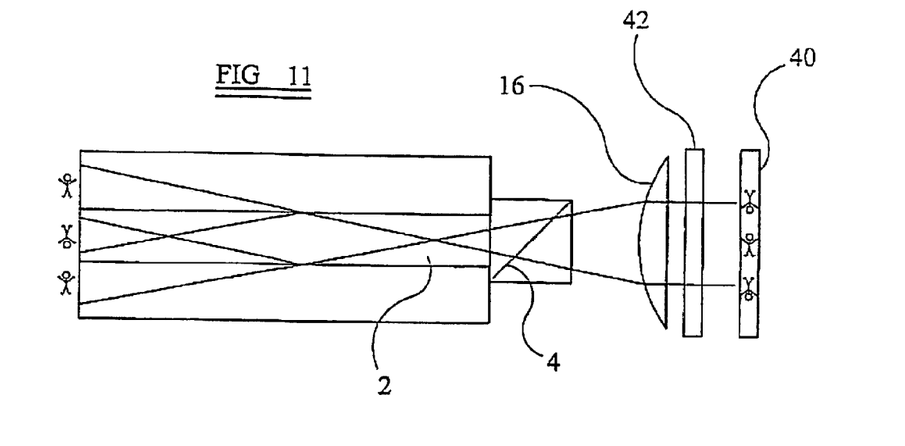
FIG. 11 is a schematic representation of part of yet another image replication system in accordance with the present invention.

Referring to FIG. 11, a further embodiment of the system comprises an optically addressed spatial light modulator (OASLM) 40 in place of the image screen 18, with a shutter 427 between the OASLM 40 and the imaging lens 16. The OASLM is an amorphous silicon photosensitive layer which modulates voltage across a reflective liquid crystal layer in response to light. The shutter 42 is electro-optically addressable (a mechanical shutter could also be used) so that only part of the OASLM 40 receives light from the EASLM 6. If the image on the EASLM 6 is changed and the shutter 42 activated to address a different region of the OASLM 40 then a highly complex image may be built up on the OASLM 40 by tiling many separate images from the EASLM 6. It should be noted that the image formed on each segment of the OASLM 40 will be derived from a different one of the virtual EASLM objects, some of which will be inverted. Thus, when certain segments of the OASLM 40 are to be addressed, the object on the EASLM 6 must be inverted relative to the final required OASLM image in order to build up the desired pattern on the OASLM 40. The shutter 42 should be as close as possible to the OASLM 40 since the images are not separated until the image plane. Increased separation between the shutter 42 and the OASLM 40 will likely result in cross-talk between images and/or pixel loss at the OASLM 40.

In yet a further preferred modification, the shutter 42 is omitted and the OASLM 40 is one which is made sensitive to the incident light in specific areas only at any given time, for example by pixelating the electrodes on the OASLM 40. The omission of a shutter 42 removes the possibility of cross-talk between images and/or pixel loss at the OASLM 40.

In yet a further modification (not shown) a scanning mirror is located between the light source and the light guide. As in FIG. 1, a diffuser is also used, in this case a narrow angle diffuser, between the light guide and the scanning mirror. In use, illumination of the scanning mirror introduces an angular bias to the light entering the light guide. By using a narrow angle diffuser, thereby spreading the light rays over a relatively small angular range, the light can be controlled so that light can be delivered at any given time to a specific region of the OASLM (eg. a single image area). Thus, there is no need for a shutter arrangement. In addition, illumination efficiency is increased since the whole of the OASLM is not illuminated at all times.

From the foregoing, it will be apparent that it may be desirable in certain embodiments to provide a combination of a shutter mechanism with a selectably sensitisable OASLM and/or a scanning mirror/narrow angle diffuser arrangement (for example when the light is incident on the image plane over a wider area than required despite the provision of the scanning mirror/narrow angle diffuser arrangement).

It will be readily appreciated by a person skilled in the art that by cycling through a sequence of different patterns on the EASLM, with time synchronisation of shutter state or OASLM sensitivity, a dynamic image can be generated at the OASLM. Such a technique is not unlike the Raster scans used to generate an image on conventional television screens.

Figure 12:
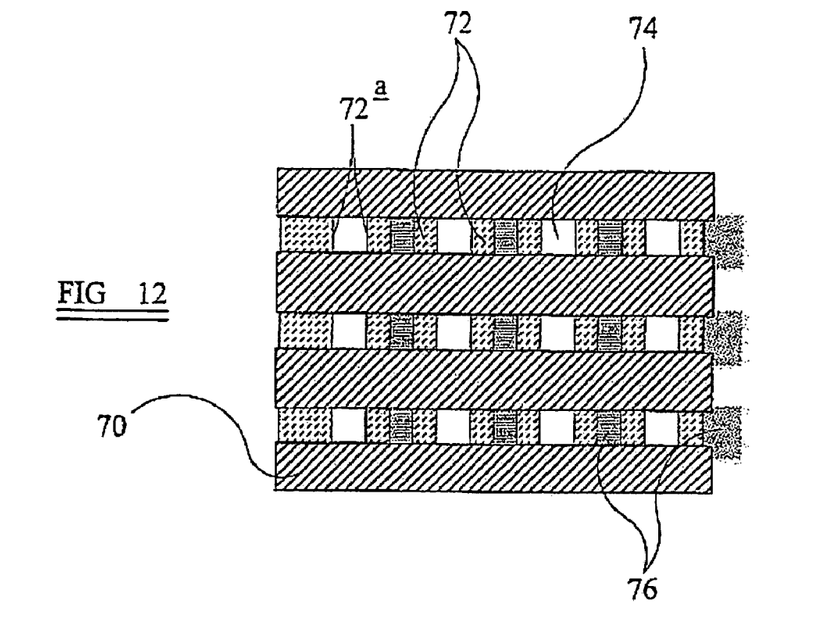
FIGS. 12 and 13 are schematic representations of light guide arrays forming part of a system in accordance with the present invention.

Referring to FIG. 12, an array of light guides is shown. Such arrays are advantageous where large pixel counts are required, such as in active tiling systems for use in volumetric imaging or 2D projection. The array comprises a plurality of horizontally arranged mutually spaced double sided flat mirror elements 70 and a plurality of spacer elements 72 arranged in pairs at spaced intervals therebetween. Each spacer element 72 of a pair is highly polished on its (flat) side surface 72a facing the other spacer element of the pair. A light pipe 74 is therefore defined between the mirror elements 70 and each pair of spacer elements 72. A gap is left between adjacent pairs of spacer elements 72 so that channels 76 are defined along the length of the array. In use, light is directed down the channels 76 towards the first end of the light pipes 74, from where the light travels down the light pipes 74 towards the object plane as described for the previous embodiments. It will be understood that the dimensions of the light pipes 74 are determined by the height of the spacer elements 72 and the spacing between pairs of spacer elements 72. If necessary, manual adjusters (not shown) can be provided to ensure that the spacing between the spacer elements 72 is precisely as required.

Figure 13:
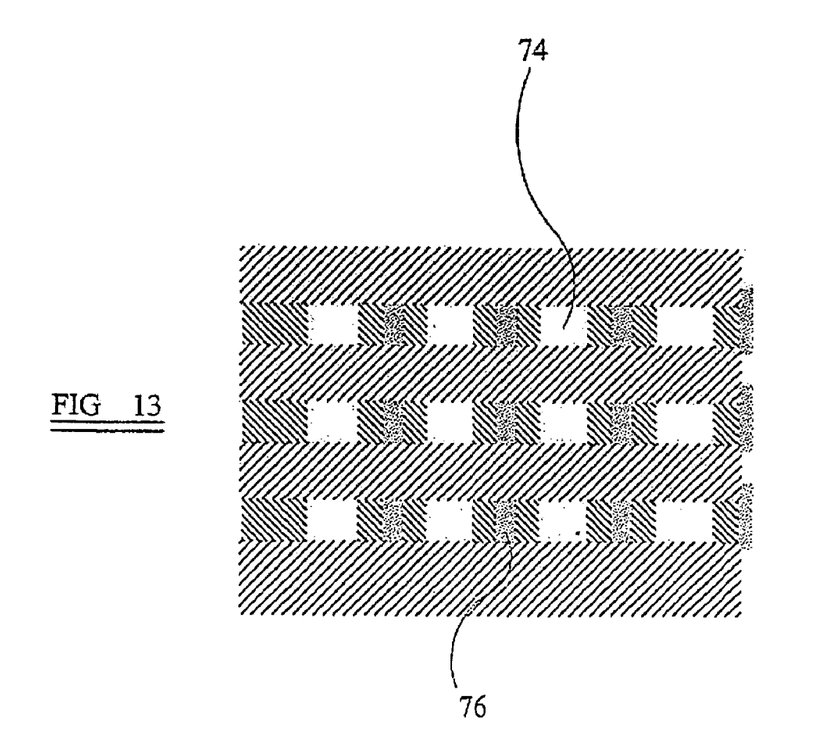

Referring to FIG. 13, an array is shown which is manufactured in a single piece of metal by casting, the appropriate surfaces already being reflective (although polishing may still be required). The piece is cast with rows of channels, the channels alternating between light pipes 74 and light insertion channels 76. The dimensions of the light pipes 74 in the array are determined during the manufacturing process. In a slight variation, the array is cast or moulded from a non-metallic castable or mouldable material (eg. a plastics material) with subsequent application of a reflective (eg. metallic) coating.

The use of hollow light guides offers several advantages over solid glass light guides. Chromatic dispersion in a glass light guide limits the bandwidth of the light source which can be used (the light guide acting as a prism). A hollow light guide allows the use of broadband sources which do not require filtering. In addition, there is a drop off in transmission through a glass light guide at the blue end of the spectrum. This does not occur with a hollow light guide and all light is delivered through the light guide. Another significant advantage relates to the lower refractive index of air compared with glass. The overall imaging performance of the system depends to a large extent on the flatness of the light guide sides.

For any given surface deformity, the degree of performance degradation is directly related to the refractive index of the light guide—the higher the refractive index, the higher the degradation. Thus, for an allowable level of degradation, the manufacturing tolerances are less stringent for a hollow light guide than for a glass light guide. Furthermore, a lower refractive index allows the length of the pipe to be reduced, yielding a more compact system, and also one which, due to the smaller component size, is easier to manufacture.

Figure 14:
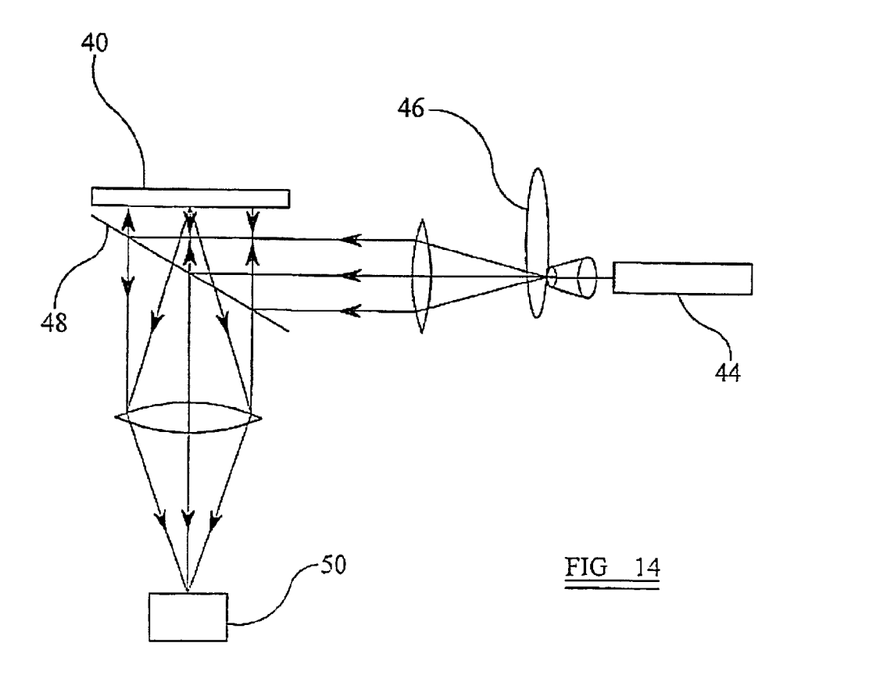
FIG. 14 is a schematic representation of part of a system for generating a holographic display.

The system of the present invention may be used to provide a holographic display. Referring to FIG. 14 a holographic display system comprises an image replication system substantially as described with reference to FIG. 11 (only OASLM 40 shown). The optical output of the OASLM 40 is then used to provide a holographic display in a conventional manner using a helium-neon laser 44 (in different embodiments, other lasers or alternative light sources such as a notched LED can be used), spinning diffuser 46 and a beam splitter 48 to provide a holographic image of the object (EASLM 6) which is viewed by a camera 50. Of course, the image can be viewed directly by the human eye.

What is claimed is:

1. An image replication systems comprising:
 (i) an elongate light guide having a polygonal cross section along its length,
 (ii) a light source arranged to direct emitted light, in use, into the light guide at its first end,
 (iii) a reflective first spatial light modulator optically coupled to the second end of light guide, and
 (v) focussing means arranged to receive light reflected through the light guide from the first spatial light modulator, said reflective light having exited the light guide through its first end, and to form multiple images derived from said first spatial light modulator in an image plane.

2. A system as claimed in claim 1, wherein the light source is a source of non-polarised light.

3. A system as claimed in claim 1, wherein the light source is a source of polarised light, and wherein means for converting polarised light to non-polerised light are provided in the light path between the light source and the light guide.

4. A system as claimed in claim 1, wherein the light source is a source of collimated light and wherein a light spreading element is disposed in the light path between the light source and the light guide.

5. A system as claimed in claim 1, wherein the light guide is in the form of a solid rod of optically transparent material, preferably glass, having first and second perpendicular polygonal end faces, said end faces being parallel to the longitudinal axis of the rod.

6. A system as claimed in claim 5, wherein the longitudinal edges of the light guide are beveled.

7. A system as claimed in claim 6, wherein the bevel depth is about 1% or less of the distance between adjacent longitudinal edges.

8. A system as claimed in claim 1, wherein the light guide is a hollow pipe, the internal surfaces of the pipe being light reflective.

9. A system as claimed in claim 8, wherein the light guide is constructed from discrete reflecting elements.

10. A system as claimed in claim 8, wherein the light guide is moulded from glass, plastics or metal.

11. A system as claimed in claim 8, wherein the light guide is sealed at its end by transparent end pieces.

12. A system as claimed in claim 11, wherein the light guide is evacuated or gas or liquid filled.

13. A system as claimed in claim 1, wherein the first spatial light modulator modulates the polarisation state of incident light.

14. A system as claimed in claim 13, wherein the first spatial light modulator comprises a pixelated liquid crystal layer on a reflective silicon backing layer, switched pixels causing modulation of the polarisation state of incident light, unswitched pixels causing no such modulation and/or absorption of light incident thereon.

15. A system as claimed in claim 13, wherein the polariser is provided in the light path between the light guide and the focussing means, orientated such that only reflected modulated light passes therethrough to form an image in the image plane and/or a polariser is provided between the light source and the light guide.

16. A system that is claimed in claim 13, wherein a polariser is provided between the light guide and first spatial light modulator, with a fractional-wave plate being provided between the polariser and the first spatial light modulator, and wherein the fractional wave plate is chosen such that only light passing through the polariser and fractional wave plate and incident on a switched pixel, passes back through the wave plate and polariser upon reflection from the spatial light modulator.

17. A system claimed in claim 1, wherein the first spatial light modulator modulates the reflectivity or angular deflection of incident light.

18. A system as claimed in claim 1, wherein the light guide is provided with an additional light source around its periphery at an end of the light guide which, in use, will be adjacent the first spatial light modulator.

19. A system as claimed in claim 18, wherein said additional light source comprises a plurality of optical fibres, and a diffusing element is provided between the optical fibres and the first spatial light modulator.

20. A system as claimed in claim 18, wherein a light steering element is provided to direct light emitted from the additional light source towards edge regions of the first light modulator.

21. A system as claimed in claim 1, wherein an image screen is provided for viewing images formed in the image plane.

22. A system as claimed in claim 1, wherein a photosensitive material is provided in an image plane.

23. A system as claimed in claim 1, wherein a second, optically addressable, spatial light modulator is provided in the image plane.

24. A system as claimed in claim 23, wherein the optically addressable spatial light modulator is a ferroelectric liquid crystal light modulator on a silicon backing.

25. A system as claimed in claims 23, wherein means are provided to selectably sensitise a predetermined region of the second spatial light modulator to incident light.

26. A system as claimed in claim 1, wherein means are provided to produce an image from light reflected from the first spatial light modulator in a predetermined region of the image plane.

27. A system as claimed in claim 26, wherein said means comprises means to introduce an angular bias to light from the light source prior to entry into the light guide in conjunction with a narrow angle diffuser.

28. A system as claimed in claim 26, wherein said means comprises an electro-optical or mechanical shutter.

29. A system as claimed in claim 1, wherein means for guiding light from the light source to the light guide are provided.

30. A system as claimed in claim 29, wherein said light guiding means comprises a beam splitter between the light source and the light guide and an optical relay between the light source and the beam splitter.

31. A system as claimed in claim 30, wherein the optical relay comprises a pair of mutually spaced lenses with a variable aperture stop therebetween.

32. A system as claimed in claim 31, wherein an amplitude mask is provided in the stop of the optical relay.

33. A system as claimed in claim 1 comprising a plurality of light guides.

34. A system as claimed in claim 33, wherein said light guides are arranged in an array such that adjacent light guides are mutually spaced.

35. An image replication method comprising providing a light source and modulating the light emitted therefrom using first spatial light modulator, the method characterised by:
    directing in a first direction light through an elongate light guide having a polygonal cross section along its length,
    modulating said light with the first spatial light modulator, reflecting said modulated light in a direction opposite to said first direction back through the light guide, and focussing said modulated light in an image plane.

* * * * *